United States Patent Office 3,473,581
Patented Oct. 21, 1969

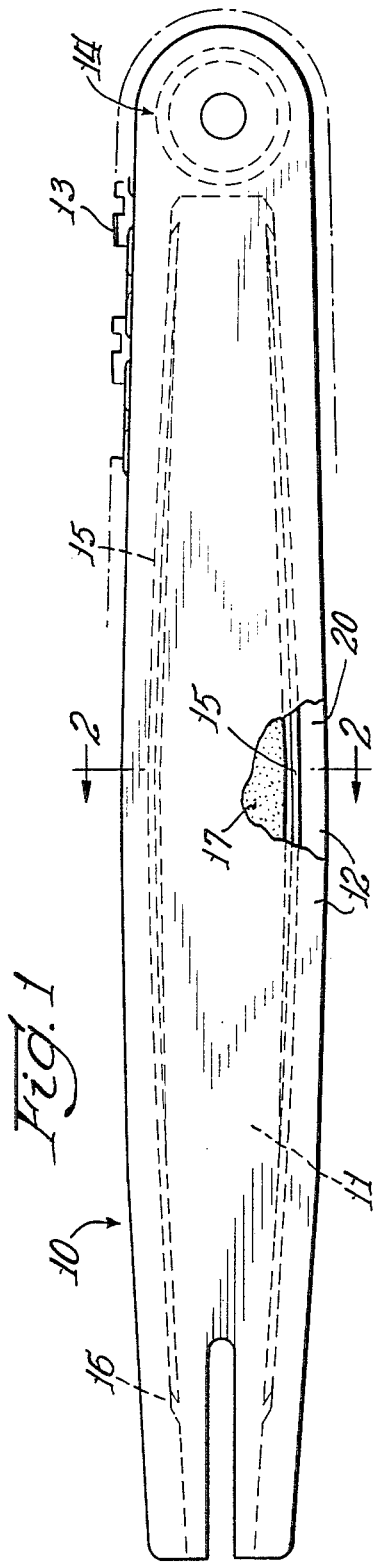
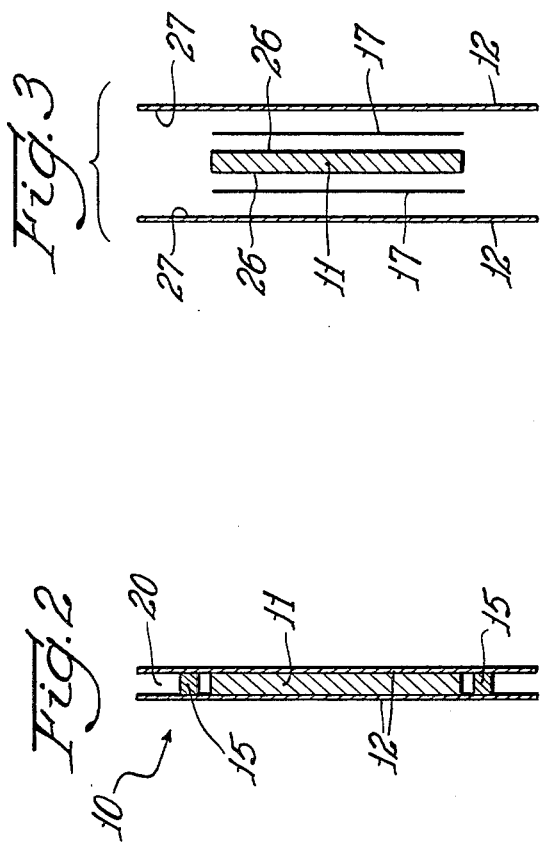

3,473,581
CHAIN SAW BAR
Max Merz, Los Angeles, Calif., assignor to Nicholson File Company, East Providence, R.I., a corporation of Rhode Island
Continuation-in-part of application Ser. No. 375,136, June 15, 1964. This application Oct. 14, 1966, Ser. No. 586,758
Int. Cl. B27b 17/02
U.S. Cl. 143—32                                    5 Claims

ABSTRACT OF THE DISCLOSURE

A laminated chain saw bar comprising a center plate of relatively non-resilient metal and two outer plates of relatively resilient metal, said plates being permanently bonded together by intervening layers of flexible adhesive, and said plates and said adhesive being in pre-stressed condition.

---

This invention relates to an improved chain saw bar and in particular, to an improved chain saw bar having an improved laminated structure. This application is a continuation-in-part of my application Ser. No. 375,136, filed June 15, 1964, now abandoned.

In the past, it has been a general practice in the art relating to chain saw bars to provide bars constructed of plates assembled in laminated fashion. Resilient plates or even a one-piece resilient bar structure have been utilized in an effort to provide a resilient bar structure that will tend to return to its original shape when deformed by the forces exerted thereon in use. The bars constructed from resilient plates are typically interlocked or otherwise secured together by rigid structures such as rivets, bolts, spot welds or by some other similar substantially rigid interconnecting securing means.

A purely resilient bar has a tendency to be too flexible and unstable in use and therefore highly undesirable. Further, excessive undesirable stresses are present in the known types of bars which are composed of a lamination of plates, secured together by rigid interconnecting means. In particular, when this type of chain saw bar is greatly deflected or otherwise caused to be extensively flexed in use, the rivets or other substantially rigid interlocking structures thereof produce undesirably high concentrated stresses in the interconnecting structures themselves as well as in the plates. The stresses in the plates are particularly excessive in the areas of the plates adjacent the interlocking structure, due to the general rigid nature of the interconnecting means and the limited cross-sectional area thereof. These stresses which are thus concentrated cause localized yielding in the plate interconnecting structure and in the plate elements of the bar during flexure of the bar. As a consequence of this yielding, this type of bar becomes permanently deformed and seriously weakened as a result of flexure.

It would therefore be highly advantageous and a definite contribution to the chain saw bar art to provide an improved laminated chain saw bar structure which provides a bar that could be severely flexed with few or no stress concentrations created therein that would result in permanent yielding, stretching and deformation of the structural elements thereof, and also a bar having a high degree of resiliency and flexibility, yet having reasonably stable conditions under circumstances of extreme physical use.

It is a primary object of this invention to provide an improved chain saw bar having a relatively simple and economical construction.

It is another primary object of this invention to provide an improved chain saw bar having stable resilient characteristics sufficient to cause it to maintain its predetermined desired shape as well as being stable under conditions of heavy duty use. Such stable resilient characteristics are largely the result of pre-stressing the chain saw bar of the present invention in a particular manner, which pre-stressing is brought about as a consequence of the novel method by which it is assembled.

It is another object of this invention to provide an improved chain saw bar having an improved laminated construction which is freer from undesirable concentrated stresses caused by flexing of the bar in use, than existing chain saw bars.

Another object of this invention is to provide an improved laminated chain saw bar wherein the laminations thereof are secured together by a flexible adhesive distributed substantially uniformly over adjacent areas between the laminations to uniformly and flexibly secure the laminations together and thereby tending to evenly distribute the load transmitted between and through the laminations during distortion thereof.

Another object of this invention is to provide an improved laminated chain saw bar having a thick substantially non-resilient lamina utilized in conjunction with thinner resilient laminae to provide a composite chain saw bar which is resilient and yet reasonably stable in use.

More particularly, it is an object of the invention to provide a saw bar of the type defined in the preceding paragraph, which is pre-stressed in that the thicker, non-resilient intermediate lamina is permanently in tension, the thinner, resilient outer laminae are permanently under compression and the adhesive layers securing the several laminae together are, as a result, continuously in shear.

Finally, it is an object of the invention to provide a method of assembling a laminated chain saw bar so as to possess the above-mentioned characteristics.

Other objects, advantages, and novel aspects of the invention will become apparent upon consideration of the following detailed description, in conjuction with the accompanying drawings wherein:

FIGURE 1 is a side view of a chain saw bar showing the relative position of the parts thereof and the general association therewith.

FIGURE 2 is a cross-sectional view taken along line 2—2 of FIGURE 1 showing the general construction of the chain saw bar.

FIGURE 3 is an exploded cross-sectional view taken along line 2—2 of FIGURE 1 showing the relative size and position of the elements of the chain saw bar.

Referring to the drawings, there is illustrated a chain saw bar, generally represented by the numeral 10, which is adapted at the left (FIGURE 1) to be secured to a chain saw drive assembly (not shown). The chain saw bar 10 includes generally a center spacer body member plate 11, outer guide plates 12, a representative portion of a saw chain 13, a typical bearing assembly 14, wear strips 15, wear strip retaining structures 16 and plate interconnecting adhesive 17.

The plates 12 are substantially wider than the body spacer 11, so that when the plates 12 and the spacer 11 are positioned in a laminated manner (FIGURE 2), the plates 12 and the spacer 11 form a peripheral groove 20, along the upper and lower lateral edges of the bar laminations 11 and 12. The wear strip retaining structures 16 extend from the periphery of the spacer 11 into the groove 20 to secure the wear strips 15 within the groove 20 (FIGURE 1).

The plates 12 are composed of thin wear-resistant resilient material such as spring steel and the spacer body plate 11 is composed of a relatively thick substantially non-resilient material such as aluminum or an alloy thereof. The plates 12 and the center spacer body 11 are secured together in laminated fashion (FIGURE 2) by resilient adhesive material 17 (FIGURE 3) such as epoxy or the like, distributed uniformly between adjacent opposed spacer and guide plate surfaces 26 and 27 respectively.

The thicker, more stable and less resilient spacer plate 11 is flexibly secured to the thinner, less stable and more resilient outer plates 12 by the flexible adhesive 17 to form a composite chain saw bar structure provided with appropriately stable flexible and resilient characteristics. The resulting bar structure 10 possesses stability, and yet possesses uniformly effective flexible resiliency. The stability provides reliable heavy duty use, and the flexible resiliency tends to avoid stretching and yielding of the bar during extreme flexure thereof and therefore has the resultant desirable characteristic of being flexible and tending to return to its original shape from extreme flexed and distorted positions without permanent deformation of any of the elements of the bar 10.

The desirable characteristics mentioned in the preceding paragraphs are due in large part, it is believed, to the method employed, and now to be disclosed, in laminating the saw bar, which results in imparting to the bar a novel and beneficial condition of pre-stress. The materials employed may comprise, for example, outer plates 12 of a steel having an expansion rate of .00000636″ per degree F. per 1″ of length. The center plate or spacer 11 may be aluminum having an expansion rate of .00001236 per degree F. per 1″ of length. The difference amounts to .000006″ per degree per 1″ of length.

The center and side plates are assembled with intervening films of epoxy adhesive, and bonded under heat and pressure. A suitable adhesive film is known as "3M Adhesive Film AF–42" obtainable from Minnesota Mining & Manufacturing Company, Saint Paul, Minn., which film is described as a non-volatile, thermo-setting film adhesive, having high shear strength and flexibility. The strips of bonding film layered between each side of the aluminum center plate and the adjacent steel outer plate are, of course, of the size and outline form of the center plate, and are approximately .003″ in thickness. Care is taken to have the metal surfaces clean, and the several laminations assembled in the desired final relationship. If desired, two or more rivets may be employed for this latter purpose, being inserted through pre-drilled holes in the several laminations in which case, however, at least one hole in the aluminum center plate must be elongated to accommodate the unequal expansion of the center plate in relation to the side plates.

After assembling in the manner described, the assembled "sandwich" is preferably subjected to a pressure of the order of 50 pounds per square inch, and is heated to a temperature of the order of 350° F. This temperature is maintained for a period of approximately one hour, the entire heating cycle requiring as much as two and one-half hours. The pressure and heat are then removed and, after cooling, any desired finishing or polishing operations are performed.

During the aforesaid heating from ambient temperature, say 70° F. to 350° F., the center plate expands lengthwise by an amount exceeding the corresponding expansion of the outer plates by .00168″ per one inch of length. For example, a 19 inch aluminum center plate will expand lengthwise to a total amount of .03192″ more than the corresponding expansion of those areas of the steel outer plates to which it is bonded. Upon cooling, however, the bond remains firm and the aluminum center plate contracts only by the same amount as do the steel outer plates. Thus, in the finished saw bar the aluminum center plate is constantly pre-stressed in tension, the corresponding areas of the steel outer plates are constantly pre-stressed in compression, and the adhesive is constantly pre-stressed in shear.

As a result of the pre-stressing condition described in the previous paragraph, the overall strength of the saw bar is improved and, it is believed, its stiffness, resiliency, and stability are also improved.

Still another advantage of a saw bar made in accordance with the invention lies in its stiffness-weight ratio. Due to the fact that the center plate is of aluminum, and considering for example a center plate approximately .137″ in thickness, a saw bar made in accordance with the invention weighs approximately 64% as much as an all-steel saw bar of corresponding dimensions. Tests have shown, however, that the stiffness of a bonded saw bar having an aluminum center plate amounts to approximately 95% of the stiffness of a corresponding all-steel saw bar. The saw bar of the present invention thus has an important advantage in weight-stiffness ratio, both weight and stiffness being very important considerations in the selection and use of chain saw bars.

With the foregoing description of the saw bar of the present invention, and the method by which it is fabricated, it will be apparent that the several objects set forth above are achieved by the invention.

Having thus described the invention, what is claimed as new and desired to be secured by Letters Patent is:

1. A laminated chain saw bar comprising a series of metallic plates permanently banded together by intervening layers of flexible adhesive, said plates and said adhesive being in pre-stressed condition, said series of metallic plates comprising a center plate of relatively non-resilient metal and two outer plates of relatively resilient metal.

2. A chain saw bar as defined in claim 1, said center plate being of aluminum-bearing material and said outer plates of steel.

3. A chain saw bar as defined in claim 1, said center plate being pre-stressed in tension and said outer plates being pre-stressed in compression.

4. A chain saw bar as defined in claim 3, said adhesive being pre-stressed in shear.

5. A chain saw bar as defined in claim 1, said center plate having a thickness exceeding one-half that of the assembled saw bar.

References Cited

UNITED STATES PATENTS 2,962,812  12/1960  Gommel _____ 29—463

FOREIGN PATENTS 649,018  9/1962  Canada.

DONALD R. SCHRAN, Primary Examiner